(12) United States Patent
Spielman, Jr.

(10) Patent No.: US 11,885,102 B2
(45) Date of Patent: Jan. 30, 2024

(54) VISUAL OVERLAYS FOR INDICATING STOPPING DISTANCES OF REMOTE CONTROLLED MACHINES

(71) Applicant: Caterpillar Inc., Peoria, IL (US)

(72) Inventor: Michael A. Spielman, Jr., Osseo, MI (US)

(73) Assignee: Caterpillar Inc., Peoria, IL (US)

( * ) Notice: Subject to any disclaimer, the term of this patent is extended or adjusted under 35 U.S.C. 154(b) by 226 days.

(21) Appl. No.: 17/645,164

(22) Filed: Dec. 20, 2021

(65) Prior Publication Data

US 2023/0193591 A1 Jun. 22, 2023

(51) Int. Cl.
| | |
|---|---|
| *G06F 7/70* | (2006.01) |
| *E02F 9/20* | (2006.01) |
| *E02F 9/22* | (2006.01) |
| *G05D 1/00* | (2006.01) |
| *G05D 1/02* | (2020.01) |

(52) U.S. Cl.
CPC ............ *E02F 9/205* (2013.01); *E02F 9/2221* (2013.01); *G05D 1/0022* (2013.01); *G05D 1/0038* (2013.01); *G05D 1/0246* (2013.01); *G05D 1/0272* (2013.01); *G05D 2201/0202* (2013.01)

(58) Field of Classification Search
CPC .............................................. G05D 2201/0202
USPC ........................................................... 701/50
See application file for complete search history.

(56) References Cited

U.S. PATENT DOCUMENTS

| | | | |
|---|---|---|---|
| 8,676,466 B2 * | 3/2014 | Mudalige | G08G 1/22 701/32.7 |
| 2014/0176709 A1 * | 6/2014 | Redenbo | H04N 7/18 348/143 |
| 2020/0324761 A1 * | 10/2020 | Magzimof | G08G 1/166 |
| 2021/0079621 A1 * | 3/2021 | Sasaki | G05D 1/0022 |
| 2022/0412049 A1 * | 12/2022 | Sasaki | G08C 17/02 |

* cited by examiner

*Primary Examiner* — Shardul D Patel
(74) *Attorney, Agent, or Firm* — Harrity & Harrity, LLP

(57) ABSTRACT

A controller may receive, from a sensor device, machine velocity data indicating a velocity of a machine controlled by a remote control device. The controller may determine, based on the machine velocity data, a distance to be traveled by the machine until the machine stops traveling after a communication, between the machine and the remote control device, is interrupted. The controller may generate, based on the distance, an overlay to indicate the distance. The controller may provide the overlay, for display, with a video feed of an environment surrounding the machine.

20 Claims, 5 Drawing Sheets

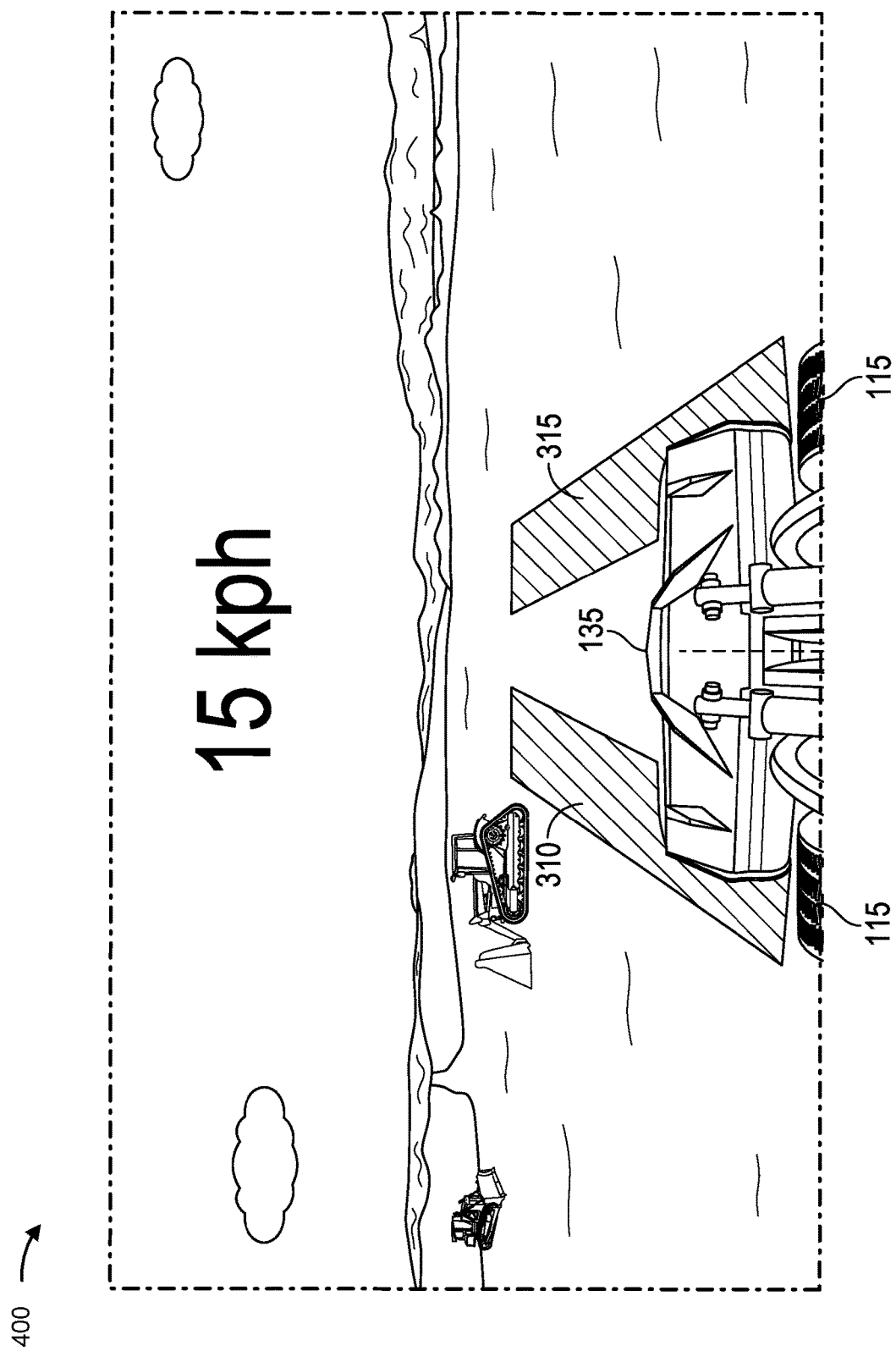

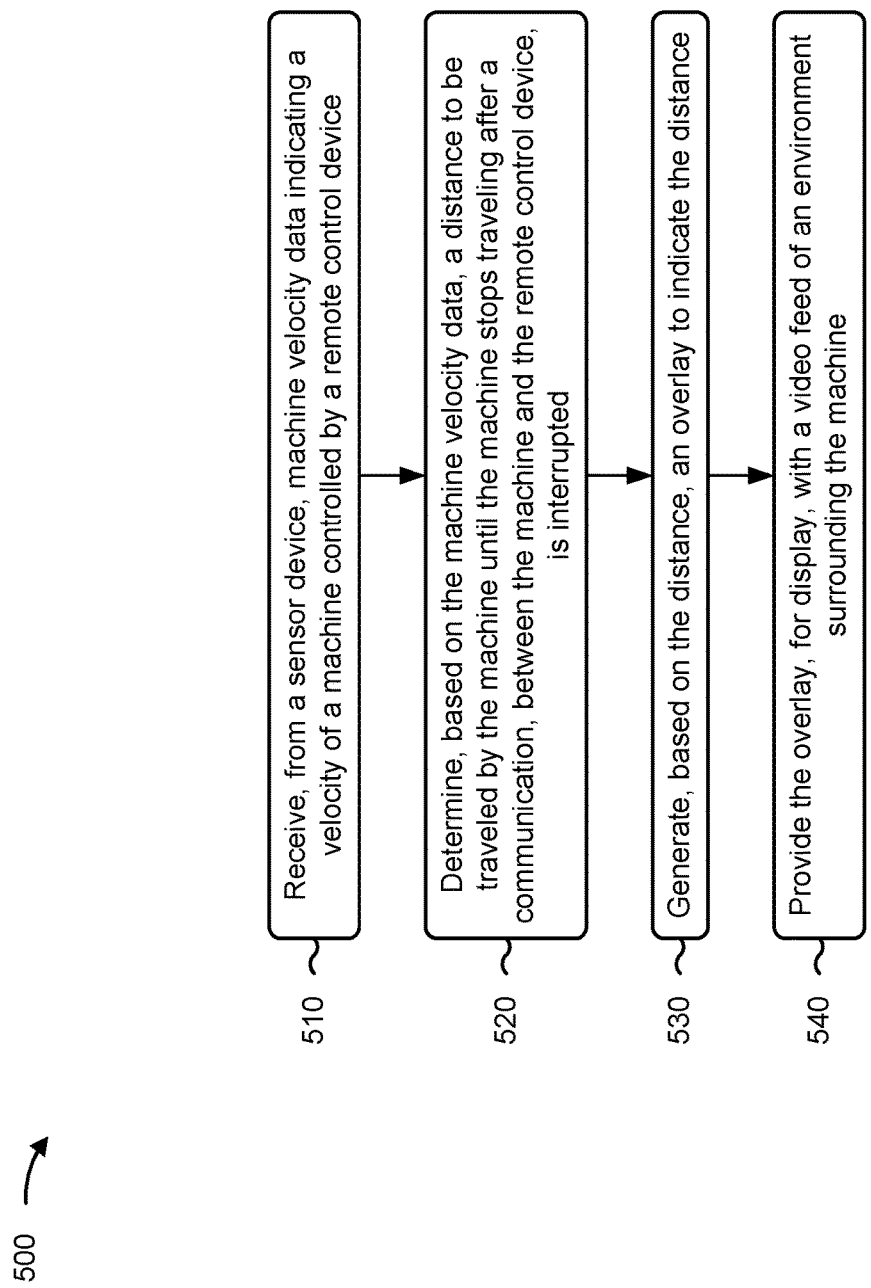

VISUAL OVERLAYS FOR INDICATING STOPPING DISTANCES OF REMOTE CONTROLLED MACHINES

TECHNICAL FIELD

The present disclosure relates generally to remotely controlling a machine and, for example, to remotely controlling the machine based on a visual overlay indicating a stopping distance.

BACKGROUND

A construction machine may be operated by a remote control device. The remote control device and the construction machine may communicate by way of wireless communication. Because the remote control device may operate the construction machine with non-line-of-sight, the construction machine may monitor a measure of quality of the wireless communication established with the remote control device.

In some situations, based on monitoring the measure of quality of the wireless communication, the construction machine may detect a loss of communication with the remote control device. As a result, the construction machine may initiate a process to decelerate in order to bring the construction machine to a stop. In this regard, the construction machine may travel a particular distance prior to stopping after the loss of communication. In some instances, an object may be provided in a path of the construction machine within a distance that is less than the particular distance. As a result, the construction machine may perform an unintended operation with respect to the object.

The visual overlay, of the present disclosure, solves one or more of the problems set forth above and/or other problems in the art.

SUMMARY

In some implementations, a system includes a sensor device configured to generate machine velocity data indicating a velocity of a construction machine controlled by a remote control device, wherein the construction machine is controlled based on a communication established between the construction machine and the remote control device; and a controller configured to: determine a deceleration rate of the construction machine; determine, based on the machine velocity data and the deceleration rate, a distance to be traveled by the construction machine until the construction machine stops traveling after the communication is interrupted; generate, based on the distance, an overlay to indicate the distance; and provide the overlay, for display by the remote control device, with a video feed of an environment surrounding the construction machine.

In some implementations, a method performed by a controller includes receiving, from a sensor device, machine velocity data indicating a velocity of a machine controlled by a remote control device; determining, based on the machine velocity data, a distance to be traveled by the machine until the machine stops traveling after a communication, between the machine and the remote control device, is interrupted; generating, based on the distance, an overlay to indicate the distance; and provide the overlay, for display, with a video feed of an environment surrounding the machine.

In some implementations, a controller includes one or more memories; and one or more processors configured to: receive machine velocity data indicating a velocity of a machine controlled by a remote control device, determine, based on the machine velocity data, a stopping distance of the machine to be traveled by the machine after the machine is unable to communicate with the remote control device, wherein the stopping distance corresponds to a distance to be traveled by the machine until the machine stops traveling; generate, based on the stopping distance, an overlay to indicate the stopping distance; and provide the overlay, for display, with a video feed of an environment surrounding the machine.

BRIEF DESCRIPTION OF THE DRAWINGS

FIG. 4 is a diagram of an example implementation described herein.

FIG. 5 is a flowchart of an example processes relating to generating visual overlays indicating stopping distances of remote controlled machines.

DETAILED DESCRIPTION

Figure 1:
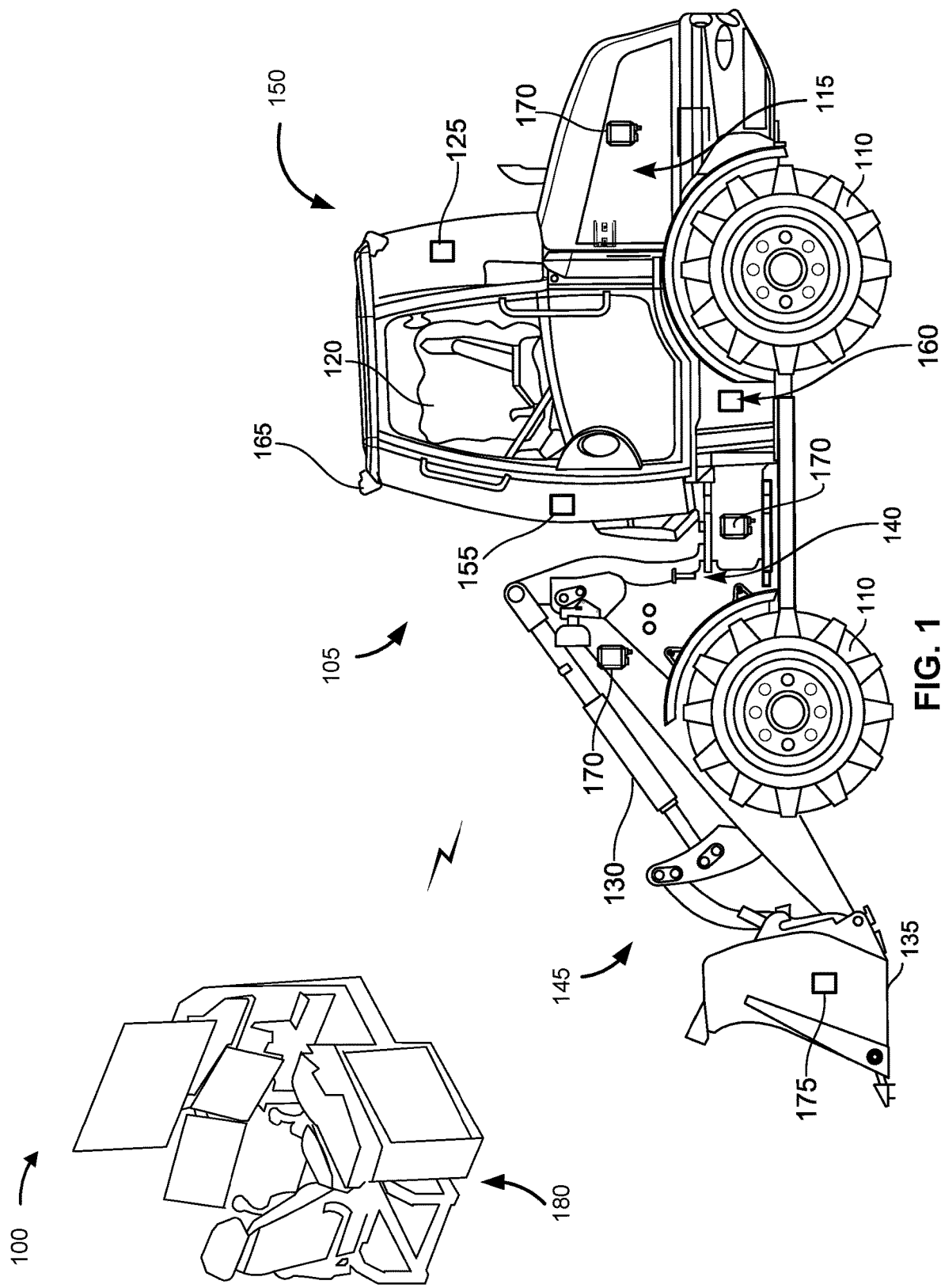
FIG. 1 is a diagram of an example machine described herein.

This present disclosure relates to overlays that are provided with a video feed (e.g., in real time or near real time) of an environment surrounding a machine controlled by a remote control device. The machine may be controlled via a wireless communication established between the machine and the remote control device.

The overlays may appear to lay over a ground surface in the video feed. The overlays may provide an indication of a distance to be traveled by the machine until the machine stops traveling after the wireless communication is interrupted. The distance may be referred to as a stopping distance. In some situations, a controller may determine a current velocity of the machine, determine an amount of time to detect a loss of communication between the machine and the remote control device, and determine a deceleration rate of the machine. The controller may determine the stopping distance to be traveled by the machine in the event of the loss of communication based on the current velocity, the amount of time to detect the loss of communication, and the deceleration rate.

In some examples, the controller may determine the stopping distance further based on a linkage position of a linkage of the machine, an articulation configuration of the machine (e.g., an articulation angle of the machine), a grade of a ground surface on which the machine is located, a load of an implement of the machine (e.g., a bucket load of a bucket of the machine), among other examples.

The controller may generate overlays (e.g., graphical information) indicating the stopping distance and may cause the overlays to be provided with the video feed. In other words, the overlays may augment the video feed with information identifying the stopping distance to be traveled by the machine during a remote control operation of the machine (without line-of-sight with respect to the machine), after the loss of communication with the remote control device.

The controller may update the stopping distance as the controller determines a change in the velocity, the amount of time to detect the loss of communication, the deceleration rate, the linkage position, the articulation configuration, the grade of the ground surface, and/or the load of the implement. Accordingly, the controller may cause the overlays to be dynamically adjusted as the stopping distance is updated. As an example, the controller may dynamically adjust a quantity of the overlays along with a length of the overlays, a width of the overlays, a color of the overlays, a shape of the overlays, among other visual characteristics of the overlays.

The overlays may improve an ability of an operator of the machine to determine how far the machine would travel in the event of the loss of communication with the remote control device. Additionally, the operator may use the overlays to provide direct feedback on a safe approach velocity to a target point (e.g., a dump target, another machine, among other examples). By providing the overlays in this manner, the machine may be prevented from performing an unintended operation with respect to an object provided in the path of the machine after a loss of communication.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

FIG. 1 is a diagram of an example implementation 100 described herein. As shown in FIG. 1, example implementation 100 includes a machine 105 and a remote control device 180. Machine 105 is embodied as an earth moving machine, such as a wheel loader. Alternatively, machine 105 may be another type of machine, such as an excavator, a dozer, among other examples.

As shown in FIG. 1, machine 105 includes ground engaging members 110, an engine 115, an operator cabin 120, a wireless communication component 125, a stick 130, and a machine work tool 135. Ground engaging members 110 may include wheels (as shown in FIG. 1), tracks, rollers, among other examples, for propelling machine 105. Ground engaging members 110 are mounted on a machine body and are driven by engine 115 and drive trains (not shown). Engine 115 may be operatively connected to provide power to drive at least one of the ground engaging members 110. Operator cabin 120 is supported by the machine body. Operator cabin 120 may include an integrated display (not shown) and operator controls (not shown), such as, for example, an integrated joystick. The operator controls may include one or more input components.

For an autonomous machine, the operator controls may not be designed for use by an operator and, rather, may be designed to operate independently from an operator. In this case, for example, the operator controls may include one or more input components that provide an input signal for use by another component without any operator input.

Wireless communication component 125 may include one or more devices that are capable of communicating with remote control device 180, as described herein. Wireless communication component 125 may include a transceiver, a separate transmitter and receiver, an antenna, among other examples. Wireless communication component 125 may communicate with the one or more machines using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples.

Additionally, or alternatively, wireless communication component 125 may communicate with remote control device 180, one or more other machines and/or one or more devices via a network that includes one or more wired and/or wireless networks.

Stick 130 is pivotally mounted at its proximal end to the machine body and is articulated relative to the machine body by one or more fluid actuation cylinders (e.g., hydraulic or pneumatic cylinders), electric motors, and/or other electro-mechanical components. Stick 130 may be referred to as a linkage. Machine work tool 135 is mounted at a distal end of stick 130 and may be articulated relative to stick 130 by one or more fluid actuation cylinders, electric motors, and/or other electro-mechanical components. Machine work tool 135 may be a bucket (as shown in FIG. 1) or another type of tool or implement that may be mounted on stick 130. Machine work tool 135 may be referred to as an implement.

Machine 105 may include an articulation joint 140, a front portion 145, a rear portion 150, a controller 155 (e.g., an electronic control module (ECM), a computer vision controller, an autonomy controller, among other examples), a sensor device 160, a camera 165, one or more inertial measurement units (IMUs) 170 (referred to herein individually as "IMU 170," and collectively referred to as "IMUs 170"), and a service device 175.

Articulation joint 140 may be configured to enable front portion 145 of machine 105 to be articulated with respect to a rear portion 150 of machine 105. Controller 155 may control and/or monitor operations of machine 105. For example, controller 155 may control and/or monitor the operations of machine 105 based on signals from sensor device 160, signals from camera 165, signals from IMUs 170, and/or signals from sensor device 175.

In some examples, controller 155 may use one or more of the signals described above to determine the stopping distance to be traveled by machine 105 in the event of a loss of communication between machine 105 and remote control device 180, as described in more detail below, in the event of a loss of visual (video feed), among other examples. Additionally, controller 155 may generate overlays (e.g., graphical information) indicating the stopping distance and may provide the overlays to remote control device 180. The overlays may be provided to cause remote control device 180 to provide the overlays with a video feed of an environment surrounding machine 105, as described in more detail below.

Sensor device 160 may include one or more devices capable of generating signals regarding an operation of machine 100. In some examples, sensor device 160 may include a velocity sensor device. For example, sensor device 160 may generate machine velocity data indicating a velocity of machine 105.

Camera 165 may include a monocular camera and/or a stereo camera. The monocular camera may include one or more devices that are capable of obtaining and providing image data (e.g., two-dimensional (2D) image data) of the environment surrounding machine 105. The image data may be included in the video feed of the environment. The stereo camera may include two or more devices that are capable of obtaining and providing image data (e.g., three-dimensional (3D) image data) of the environment. The image data (of the stereo camera) may be included in the video feed of the environment.

As shown in FIG. 1, IMUs 170 are installed at different positions on components or portions of machine 105, such as, for example, stick 130, the machine body, engine 115, among other examples. An IMU 170 includes one or more devices that are capable of receiving, generating, storing, processing, and/or providing signals indicating a position and orientation of a component, of machine 105, on which IMU 170 is installed. For example, IMU 170 may include one or more accelerometers and/or one or more gyroscopes.

The one or more accelerometers and/or the one or more gyroscopes generate and provide signals that can be used to determine a position and orientation of the IMU 170 relative to a frame of reference and, accordingly, a position and orientation of the component. In some examples, IMU 170 may generate and provide signals that may be used to determine an articulation configuration (or an articulation angle) of front portion 145 with respect to a rear portion 150, a deceleration rate of machine 105, an acceleration rate of machine 105, among other examples. While the example discussed herein refers to IMUs 170, the present disclosure is applicable to using one or more other types of sensor devices that may be used to determine a position and orientation of a component of machine 105, the articulation configuration, the deceleration rate, the acceleration rate, among other examples.

Sensor device 175 may include one or more devices capable of generating signals regarding an operation of machine 100. In some examples, sensor device 175 may include a payload sensor device. In this regard, sensor device 175 may generate payload data indicating a load of an implement of machine 105 (e.g., a bucket load of machine work tool 135).

Remote control device 180 may include one or more devices that are configured to be used for a remote control operation of machine 105 (e.g., a remote control operation without line-of-sight with respect to machine 105). For example, remote control device 180 may include one or more displays, one or more operator controls (similar to the operator controls of machine 105), one or more controllers (similar to controller 155), a wireless communication component (similar to wireless communication component 125), among other examples.

Remote control device 180 may establish a communication with machine 105 via the wireless communication component and may control machine 105 using the wireless communication. Remote control device 180 may display, via the one or more displays, the video feed (including the image data obtained by camera 165). In some examples, remote control device 180 may include one or more input components (e.g., a keyboard, a microphone, joysticks, buttons, pedals, among other examples) that are used to provide input regarding the video feed.

As indicated above, FIG. 1 is provided as an example. Other examples may differ from what was described in connection with FIG. 1.

Figure 2:
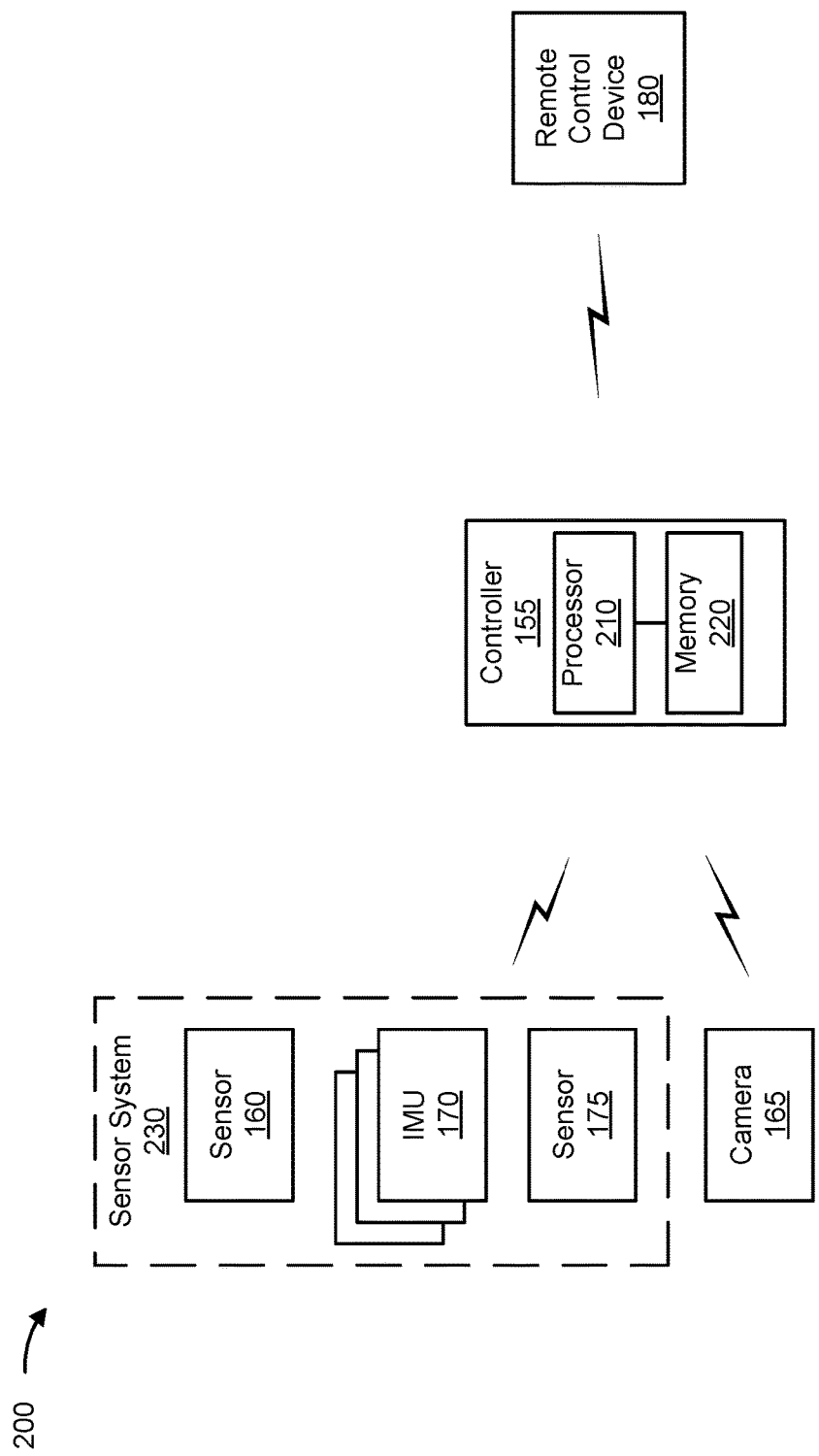
FIG. 2 is a diagram of an example system described herein.

FIG. 2 is a diagram of an example system 200 described herein. As shown in FIG. 2, system 200 includes controller 155, camera 165, remote control device 180, and a sensor system 230. Controller 155, camera 165, and remote control device 180 have been described above in connection with FIG. 1. In some examples, controller 155 may be included in machine 105, as illustrated above in FIG. 1. Alternatively, controller 155 may be included in remote control device 180. Alternatively, controller 155 may be included in a device different than the remote control device 180 (hereinafter referred to as "controller associated device"). For instance, controller 155 may be part of a back office system.

Controller 155 may include one or more processors 210 (referred to herein individually as "processor 210," and collectively as "processors 210"), and one or more memories 220 (referred to herein individually as "memory 220," and collectively as "memories 220"). A processor 210 is implemented in hardware, firmware, and/or a combination of hardware and software. Processor 210 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. A processor 210 may be capable of being programmed to perform a function.

Memory 220 includes a random-access memory (RAM), a read only memory (ROM), and/or another type of dynamic or static storage device (e.g., a flash memory, a magnetic memory, and/or an optical memory) that stores information and/or instructions for use by a processor 210 to perform a function. For example, when performing the function, controller 155 may determine the stopping distance of machine 105, generate one or more overlays indicating the stopping distance, and provide the one or more overlays to remote control device 180 for display with the video feed.

Sensor system 230 may include sensor device 160, IMUs 170, and sensor device 175. Sensor device 160, IMUs 170, and sensor device 175 have been described above in connection with FIG. 1. Controller 155 may determine the stopping distance based on signals (or data) from sensor system 230. In some examples, controller 155 may obtain the signals periodically (e.g., every thirty seconds, every minute, among other examples). Additionally, or alternatively, controller 155 may obtain the signals based on a trigger, such as a request from controller 155, a request from remote control device 180, among other examples.

In some examples, when determining the stopping distance, controller 155 may obtain, from sensor device 160, the machine velocity data indicating the velocity of machine 105 and may determine the deceleration rate of machine 105. In some instances, machine 105 may determine the deceleration rate based on obtaining information identifying the deceleration rate from a memory associated with controller 155. As example, the memory may include a deceleration data structure that stores the information identifying the deceleration rate in association with information identifying machine 105 (e.g., a model number, a serial number, among other information that may identify machine 105).

In some examples, the deceleration rate may be based on a type of machine 105, a physical attribute of machine 105, a model number of machine 105, a serial number of machine 105, among other examples. The physical attributes may include machine a mass of machine 105, a weight of machine 105, a center of gravity of machine 105, articulation kinematics of machine 105, tip stability of machine 105, linkage kinematics of machine 105, and/or payload weight of machine 105. In some instance, the deceleration rate may be based on data regarding stopping and stability performance of machine 105. Additionally, or alternatively, to obtaining the information identifying the deceleration rate, machine 105 may obtain deceleration rate data from sensor system 230 (e.g., from an IMU 170). The deceleration rate data may indicate the deceleration rate of machine 105.

In some examples, controller 155 may determine the stopping distance based on a mathematical combination of the velocity of machine 105 and the deceleration rate of machine 105. For example, controller 155 may determine the stopping distance based on the following formula:

$$D = v^2/2dg$$

where D is the stopping distance, v is the velocity, d is the deceleration rate, and g is gravity.

The above formula is merely provided as an example. Other examples may be used to determine stopping distances. In some implementations, controller 155 may determine the stopping distance further based on one or more additional parameters. In some situations, controller 155 may increase the stopping distance (determined above) based on the one or more additional parameters.

A first parameter may include an amount of time for machine 105 (e.g., one or more components of machine 105) to detect a loss of communication between controller 155 and remote control device 180. The amount of time may be referred to as a loss detection time. The loss detection time may be based on an amount of time that a machine (similar to machine 105) takes to detect the loss of communication (e.g., detect that the communication, between machine 105 and remote control device 180, has been interrupted). The loss of communication may occur due to a malfunction of wireless communication component 125, poor wireless signal strength, environment conditions, among other examples.

Controller 155 may determine the stopping distance (determined above using the velocity and the deceleration) further based on the loss detection time by increasing the stopping distance based on the loss detection time. For example, controller 155 may increase the stopping distance (determined above) by a value that is based on the loss detection time. The value may be determined by a mathematical combination of the loss detection time and a factor.

In some instances, he loss detection time may be stored in a memory associated with controller 155. In some situations, loss detection times may be based on a machine type, a machine serial number, a machine model number, among other examples. In this regard, different loss detection times may be stored in a loss detection data structure in association with information identifying different machine types, information identifying different machine serial number, information identifying different machine model numbers, among other examples. For example, a first loss detection time may be stored with information identifying a first machine type, a second loss detection time may be stored with information identifying a second machine type, a third loss detection time may be stored with information identifying a first machine serial number, and so on.

A second parameter may include the linkage position of the linkage of machine 105. For example, machine 105 may obtain, from sensor system 230, linkage data indicating the linkage position. For instance, the linkage data may be generated by an IMU 170 located on and/or located adjacent to the linkage. Controller 155 may determine the stopping distance (determined above using the velocity and the deceleration) further based on the linkage data.

For example, controller 155 may increase the stopping distance by a value that is based on the linkage data. The value may be determined by a mathematical combination of the linkage data and a factor. As an example, the value may increase as the linkage is raised above the ground surface and/or as the linkage is moved away from the machine body of machine 105.

Conversely, the value may decrease as the linkage is lowered towards the ground surface and/or as the linkage is moved closer to the machine body of machine 105.

A third parameter may include the articulation configuration of machine 105 (e.g., an articulation angle between front portion 145 and rear portion 150). For example, machine 105 may obtain, from sensor system 230, articulation data indicating the articulation configuration of machine 105. For instance, the articulation data may be generated by IMUs 170 located on and/or located adjacent to front portion 145 and rear portion 150. Controller 155 may determine the stopping distance (determined above using the velocity and the deceleration) further based on the articulation data.

For example, controller 155 may increase the stopping distance by a value that is based on the articulation data. The value may be determined by a mathematical combination of the articulation data and a factor. As an example, the value may increase as the articulation angle decreases. Conversely, the value may decrease as the articulation angle increases.

A fourth parameter may include a grade of a ground surface on which machine 105 is located. For example, machine 105 may obtain, from sensor system 230, grade data indicating the grade (e.g., indicating that the ground surface is an inclined surface or a declined surface). For instance, the grade data may be generated by one or more IMUs 170. Controller 155 may determine the stopping distance (determined above using the velocity and the deceleration) further based on the grade data.

For example, controller 155 may increase the stopping distance by a value that is based on the grade data. The value may be determined by a mathematical combination of the grade data and a factor. As an example, the value may increase as the grade decreases (e.g., as a slope of the ground surface decreases). Conversely, the value may decrease as the grade increases (e.g., as a slope of the ground surface increases).

A fifth parameter may include a load of an implement of machine 105 (e.g., a bucket load of machine work tool 135). For example, machine 105 may obtain, from sensor system 230, payload data indicating a load of the implement. For instance, the payload data may be generated by sensor device 175. Controller 155 may determine the stopping distance (determined above using the velocity and the deceleration) further based on the payload data.

For example, controller 155 may increase the stopping distance by a value that is based on the payload data. The value may be determined by a mathematical combination of the payload data and a factor. As an example, the value may increase as the load increases (e.g., as a mass of material, moved by the implement, increases). Conversely, the value may decrease as the load decreases.

In some implementations, controller 155 may obtain information identifying the stopping distance from a distance data structure, instead of determining the stopping distance as described above. For example, the distance data structure may store information identifying different stopping distances associated with information identifying different machine types, information identifying different velocities, information identifying different deceleration rates, information identifying different loss detection times, information identifying different linkage positions, information identifying different articulation angles, information identifying different grades, and/or information identifying different bucket loads.

For instance, a first entry of the distance data structure may store a first stopping distance in association with information identifying a first machine type, a first velocity, a first deceleration rate along with information identifying a first loss detection time, information identifying a first linkage position, a first articulation angle, a first grade, and/or a first bucket load; store a second stopping distance in association with information identifying a second machine type, a second velocity, a second deceleration rate along with information identifying a second loss detection time, information identifying a second linkage position, a second articulation angle, a second grade, and/or a second bucket load; and so on. In this regard, the first stopping distance may be determined based on the first velocity, the first deceleration rate, the first linkage position, the first articulation angle, the first grade, and/or the first bucket load.

The second stopping distance may be determined based on the second velocity, the second deceleration rate, the second linkage position, the second articulation angle, the second grade, and/or the second bucket load. Accordingly, in some examples, controller 155 may determine the stopping distance of machine 105 by performing a lookup of the distance data structure. For example, controller 155 may perform the lookup using information identifying the velocity, the deceleration rate, the linkage position, the articulation angle, the grade, the bucket load, and/or the loss detection time.

Controller 155 may generate the one or more overlays based on the stopping distance. For example, controller 155 may generate the one or more overlays to indicate the stopping distance. The one or more overlays may be of different sizes, different colors, different shapes, among other examples of visual characteristics of the one or more overlays. For example, a length of the one or more overlays may be based on the stopping distance. For instance, the length may be a first length when the stopping distance is a first distance, the length may be a second length (exceeding the first length) when the stopping distance is a second distance exceeding the first distance, and so on.

Similarly, a color of the one or more overlays may be based on the stopping distance. For instance, the color may be a first color when the stopping distance does not satisfy a first distance threshold, the color may be a second color (different than the first color) when the stopping distance satisfies the first distance threshold but does not satisfy a second distance threshold that exceeds the first distance threshold, and so on.

In some examples, the one or more overlays may include semitransparent bands that are vertical with respect to a traveling direction of machine 105. The one or more overlays may appear to lay over the ground surface at one or more areas associated with the stopping distance (e.g., along a path and/or a direction traveled by machine 105). When generating the one or more overlays, controller 155 may modify portions of the image data corresponding to the stopping distance. For example, controller 155 may generate the one or more overlays by modifying pixels, of the image data, corresponding to the one or more areas associated with the stopping distance.

For instance, controller 155 may modify the pixels by causing a shade of a color of the pixels to be lightened, modify the pixels by changing the color of the pixels to a particular color, modify the pixels to generate a graphical pattern, and/or may modify the pixels to generate a graphical design. In some examples, the one or more overlays may indicate different stopping distances using same graphical information (e.g., a same shade, a same color, a same graphical pattern, and a same graphical design). Alternatively, the overlays may indicate the different stopping distances using different graphical information. For example, a first overlay may indicate the first stopping distance using first graphical information, a second overlay may indicate the second stopping distance using second graphical information, and so on.

Controller 155 may be preconfigured with the graphical information indicating the different stopping distances. For example, one or more memories 220 may include a graphical data structure that stores the first graphical information in association with information identifying the first stopping distance, stores the second graphical information in association with information identifying the second stopping distance, and so on.

The first graphical information may include one or more of a first color, a first graphical pattern, or a first graphical design. The second graphical information may include one or more of a second color, a second graphical pattern, or a second graphical design. In some implementations, when determining the stopping distance, controller 155 may determine a range of distances and may generate the one or more overlays based on the range of distances (e.g., based on a maximum distance of the range of distances). In this regard, the information identifying the first stopping distance may include information identifying a first range of stopping distances, the information identifying the second stopping distance may include information identifying a second range of stopping distances, and so on.

In addition, or in the alternative, to controller 155 being preconfigured with the graphical information indicating the different stopping distances, controller 155 may receive the graphical information from the controller associated device, from remote control device 180, and/or from the input component of machine 105.

In some implementations, various aspects of the one or more overlays (to be provided with the video feed) may be configured by controller 155 based on different factors. For example, a quantity of the one or more overlays, a measure of transparency of the one or more overlays, a color of the one or more overlays, and/or a width of the one or more overlays may be configured by controller 155 based on different factors. The different factors may include the type of machine 105, a type of task performed by machine 105, a time at which the task is performed, an environmental condition (e.g., rain, snow, hail, among other examples), among other examples.

In some situations, controller 155 may determine the quantity of the one or more overlays based on one or more of the different factors (e.g., the type of machine 105 and/or the type of task), may determine the measure of transparency based on one or more of the different factors (e.g., the type of task and/or the time at the task is performed), and so on. In some instances, when determining the various aspects, controller 155 may perform a lookup of a data structure that stores information identifying the various aspects in association with information identifying the different factors. Additionally, or alternatively, controller 155 may receive information identifying the various aspects from remote control device 180 and/or from the controller associated device.

Controller 155 may provide the one or more overlays to remote control device 180 for display with the video feed. In some instances, controller 155 may provide the one or more overlays periodically (e.g., every minute, every 5 minutes, among other examples). Additionally, or alternatively, controller 155 may provide the one or more overlays based on a trigger. The trigger may include a request from remote control device 180, detecting an object in a path of machine 105, detecting an acceleration of machine 105, detecting that wireless communication component 125 is malfunctioning, detecting that a wireless signal strength does not satisfy a signal strength threshold, detecting an environment condition (e.g., detecting rain, snow, moisture on the ground surface), among other examples.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
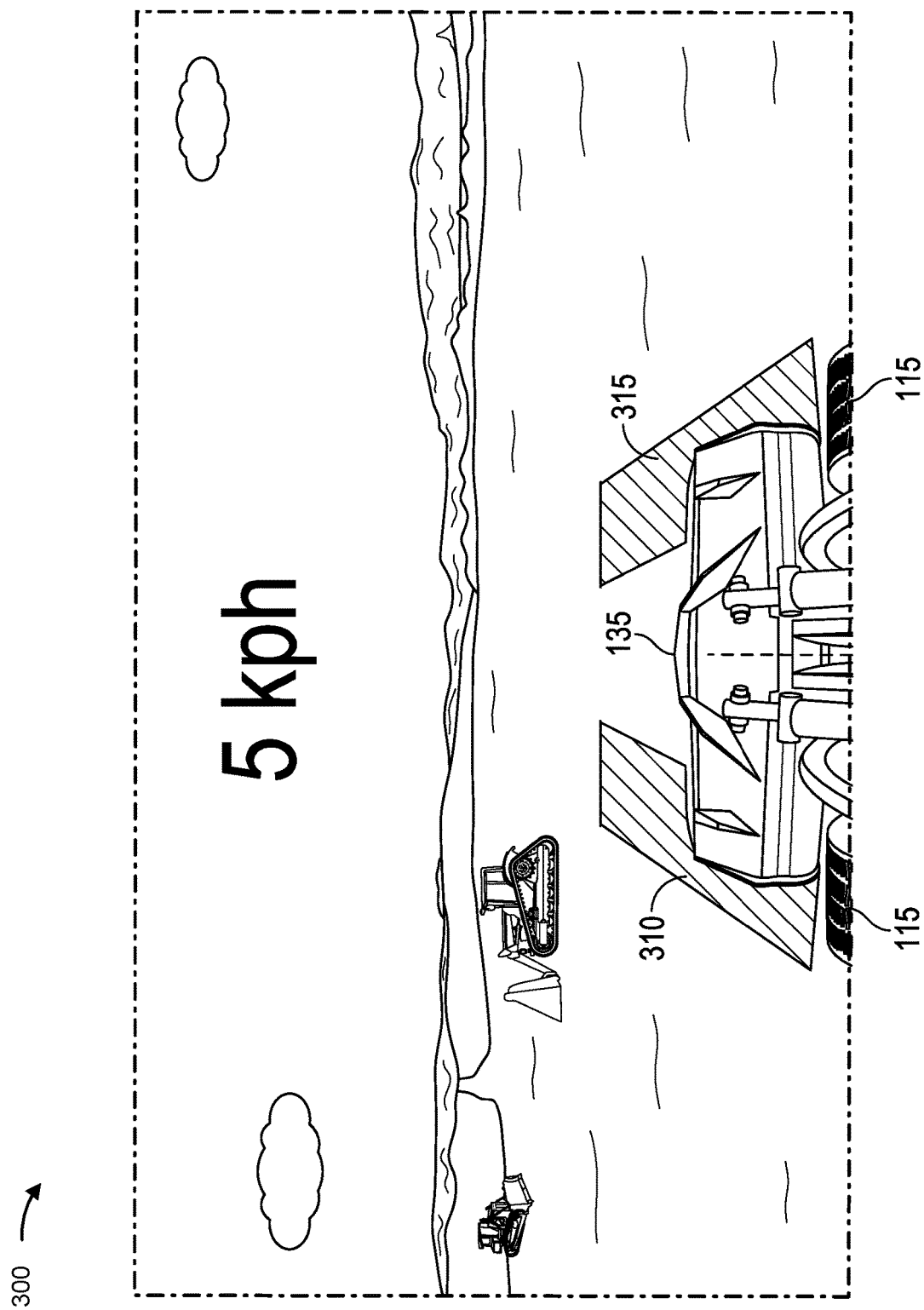
FIG. 3 is a diagram of an example implementation described herein.

FIG. 3 is a diagram of an example implementation 300 described herein. As shown in FIG. 3, example implementation 300 may include information provided on a display of remote control device 180. For example, the display of remote control device 180 may display a video feed, in real time or near real time, of an environment surrounding machine 105. The video feed may be generated based on image data obtained by camera 165.

As shown in FIG. 3, the video feed includes overlay 310 and overlay 315 which appear to lay over a ground surface on which machine 105 is located. Overlay 310 and overlay 315 may be generated in a manner similar to the manner described above in FIG. 2 in connection with generating overlays. Overlay 310 and overlay 315 may indicate a stopping distance determined in a manner similar to the manner described above in FIG. 2 in connection with determining the stopping distance. The video feed further includes information identifying a velocity of machine 105.

The quantity of the overlays and the visual characteristics of the overlays are merely provided as an example. Other quantities and visual characteristics may be used in different situations.

As indicated above, FIG. 3 is provided as an example. Other examples may differ from what was described in connection with FIG. 3.

FIG. 4 is a diagram of an example implementation 400 described herein. As shown in FIG. 4, example implementation 300 may include information provided on a display of remote control device 180. For example, the display of remote control device 180 may display a video feed, in real time or near real time, of an environment that includes a ground surface on which machine 105 is located. The video feed may be generated based on image data obtained by camera 165. The video feed includes overlay 310 and overlay 315 (described above in connection with FIG. 3) along information identifying a velocity of machine 105.

As shown in FIG. 4, the velocity of machine 105 has increased. Accordingly, as shown in FIG. 4, overlay 310 and overlay 315 have been dynamically adjusted based on the increase in the velocity of machine 105. For example, a length of overlay 310 and a length of overlay 315 have increased to reflect the increased velocity of machine 105.

The quantity of the overlays and the visual characteristics of the overlays are merely provided as an example. Other quantities and visual characteristics may be used in different situations.

As indicated above, FIG. 4 is provided as an example. Other examples may differ from what was described in connection with FIG. 4.

FIG. 5 is a flowchart of an example process 500 associated with generating visual overlays indicating stopping distances of remote controlled machines. In some implementations, one or more process blocks of FIG. 5 may be performed by a controller (e.g., controller 155). In some implementations, one or more process blocks of FIG. 5 may be performed by another device or a group of devices separate from or including the controller, such as a remote control device (e.g., remote control device 180).

As shown in FIG. 5, process 500 may include receiving, from a sensor device, machine velocity data indicating a velocity of a machine controlled by a remote control device (block 510). For example, the controller may receive, from a sensor device, machine velocity data indicating a velocity of a machine controlled by a remote control device, as described above.

In some implementations, the sensor device is a first sensor device, wherein the method further comprises receiving, from one or more second sensor devices, at least one of data indicating a linkage position of a linkage of the machine, or data indicating a load of an implement of the machine.

As further shown in FIG. 5, process 500 may include determining, based on the machine velocity data, a distance to be traveled by the machine until the machine stops traveling after a communication, between the machine and the remote control device, is interrupted (block 520). For example, the controller may determine, based on the machine velocity data, a distance to be traveled by the machine until the machine stops traveling after a communication, between the machine and the remote control device, is interrupted, as described above.

In some implementations, determining the distance comprises determining the distance based on the machine velocity data and the at least one of the linkage data or the payload data.

As further shown in FIG. 5, process 500 may include generating, based on the distance, an overlay to indicate the distance (block 530). For example, the controller may generate, based on the distance, an overlay to indicate the distance, as described above.

As further shown in FIG. 5, process 500 may include providing the overlay, for display, with a video feed of an environment surrounding the machine (block 540). For example, the controller may provide the overlay, for display, with a video feed of an environment surrounding the machine, as described above.

In some implementations, providing the overlay comprises receiving image data from a camera associated with the machine, and providing the overlay with the video feed based on the image data.

In some implementations, process 500 includes detecting a change in the velocity of the machine based on additional machine velocity data received from the sensor device, determining an update to the distance to be traveled by the machine based on the change in the velocity, and adjusting a visual characteristic of the overlay, provided with the video feed, based on determining the update to the distance.

In some implementations, the sensor device is a first sensor device, wherein the method further comprises receiving, from a second sensor device, grade data indicating a grade of the ground surface, wherein determining the distance comprises determining the distance based on the machine velocity data and the grade data.

In some implementations, process 500 includes determining an amount of time to detect that the machine has been unable to communicate with the remote control device, and wherein determining the distance comprises determining the distance based on the machine velocity data and the amount of time.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The present disclosure relates to overlays that are provided with a video feed (e.g., in real time or near real time) of an environment surrounding a machine controlled by a remote control device. As an example, the machine may be controlled via a wireless communication established between the machine and the remote control device. The overlays may appear to lay over a ground surface in the video feed and may provide an indication of a stopping distance to be traveled by the machine until the machine stops traveling after the wireless communication is interrupted.

Typically, the machine may initiate a process to decelerate in order to bring the machine to a stop when the wireless communication is interrupted. The machine may travel a particular distance prior to stopping. Accordingly, when an object is provided in a path of the machine within a distance that is less than the particular distance, the machine may perform an unintended operation with respect to the object.

The overlays described herein resolve one or more of the problems set forth above and/or other problems in the art. For example, the overlays may improve an ability of an operator of the machine to determine how far the machine would travel in the event of the loss of communication with the remote control device. Additionally, the operator may use the overlays to have direct feedback on a safe approach velocity to a target point (e.g., a dump target, another machine, among other examples). By providing the overlays in this manner, the machine may be prevented from performing an unintended operation with respect to an object provided in the path of the machine after a loss of communication, after a loss of visual (video feed), among other examples.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
    a sensor device configured to generate machine velocity data indicating a velocity of a construction machine controlled by a remote control device,
        wherein the construction machine is controlled based on a communication established between the construction machine and the remote control device; and
    a controller configured to:
        determine a deceleration rate of the construction machine;
        determine, based on the machine velocity data and the deceleration rate, a distance to be traveled by the construction machine until the construction machine stops traveling after the communication is interrupted;
        generate, based on the distance, an overlay to indicate the distance; and
        provide the overlay, for display by the remote control device, with a video feed of an environment surrounding the construction machine.

2. The system of claim 1, wherein the controller is further configured to:
    determine an amount of time to detect that the communication has been interrupted; and
    determine the distance based on the machine velocity data and the amount of time.

3. The system of claim 1, further comprising:
    a camera configured to obtain image data of the environment,
        wherein the video feed is based on the image data.

4. The system of claim 1, wherein the sensor device is a first sensor device,
    wherein the system further comprises:
        a second sensor device configured to generate articulation data indicating an articulation configuration of the construction machine, and
    wherein the controller, to determine the distance, is configured to:
        determine the distance based on the machine velocity data and the articulation data.

5. The system of claim 1, wherein the sensor device is a first sensor device,
    wherein the system further comprises:
        a second sensor device configured to generate linkage data indicating a linkage position of a linkage of the construction machine, and
    wherein the controller, to determine the distance, is configured to:
        determine the distance based on the machine velocity data and the linkage data.

6. The system of claim 1, wherein the sensor device is a first sensor device,
    wherein the system further comprises:
        a second sensor device configured to generate payload data indicating a bucket load of a bucket of the construction machine,
    wherein the controller, to determine the distance, is configured to:
        determine the distance based on the machine velocity data and the payload data.

7. The system of claim 1, wherein the controller, to determine the distance, is configured to:
   determine information identifying a physical attribute of the construction machine; and
   determine the distance based on the machine velocity data and the information identifying the physical attribute.

8. A method performed by a controller, the method comprising:
   receiving, from a sensor device, machine velocity data indicating a velocity of a machine controlled by a remote control device;
   determining, based on the machine velocity data, a distance to be traveled by the machine until the machine stops traveling after a communication, between the machine and the remote control device, is interrupted;
   generating, based on the distance, an overlay to indicate the distance; and
   provide the overlay, for display, with a video feed of an environment surrounding the machine.

9. The method of claim 8, further comprising:
   detecting a change in the velocity of the machine based on additional machine velocity data received from the sensor device;
   determining an update to the distance to be traveled by the machine based on the change in the velocity; and
   adjusting a visual characteristic of the overlay, provided with the video feed, based on determining the update to the distance.

10. The method of claim 8, wherein the sensor device is a first sensor device,
    wherein the method further comprises:
       receiving, from a second sensor device, grade data indicating a grade of a ground surface included in the environment,
    wherein determining the distance comprises:
       determining the distance based on the machine velocity data and the grade data.

11. The method of claim 8, further comprising:
    determining an amount of time to detect that the machine has been unable to communicate with the remote control device, and
    wherein determining the distance comprises:
       determining the distance based on the machine velocity data and the amount of time.

12. The method of claim 8, wherein providing the overlay comprises:
    receiving image data from a camera associated with the machine; and
    providing the overlay with the video feed based on the image data.

13. The method of claim 8, further comprising:
    determining at least one of:
       a deceleration rate of the machine, or
       information identifying a physical attribute of the machine, and
    wherein determining the distance comprises:
       determining the distance based on the machine velocity data and the at least one of the deceleration rate or the information identifying the physical attribute.

14. The method of claim 8, wherein the sensor device is a first sensor device,
    wherein the method further comprises:
       receiving, from one or more second sensor devices, at least one of:
          linkage data indicating a linkage position of a linkage of the machine, or
          payload data indicating a load of an implement of the machine, and
    wherein determining the distance comprises:
       determining the distance based on the machine velocity data and the at least one of the linkage data or the payload data.

15. A controller, comprising:
    one or more memories; and
    one or more processors configured to:
       receive machine velocity data indicating a velocity of a machine controlled by a remote control device,
       determine, based on the machine velocity data, a stopping distance of the machine to be traveled by the machine after the machine is unable to communicate with the remote control device,
          wherein the stopping distance corresponds to a distance to be traveled by the machine until the machine stops traveling;
       generate, based on the stopping distance, an overlay to indicate the stopping distance; and
       provide the overlay, for display, with a video feed of an environment surrounding the machine.

16. The controller of claim 15, wherein the one or more processors are further configured to:
    detect a change in the velocity of the machine; and
    dynamically adjust a visual characteristic of the overlay, provided with the video feed, based on detecting the change in the velocity of the machine.

17. The controller of claim 15, wherein the one or more processors are further configured to:
    determine an amount of time to detect that the machine is unable to communicate with the remote control device, and
    wherein the one or more processors, to determine the stopping distance, are configured to:
       determine the stopping distance based on the machine velocity data and the amount of time.

18. The controller of claim 15, wherein the one or more processors, to determine the distance, are configured to:
    determine at least one of:
       a deceleration rate of the machine, or
       information identifying a physical attribute of the machine; and
       determine the stopping distance based on the machine velocity data and the at least one of the deceleration rate or the information identifying the physical attribute.

19. The controller of claim 15, wherein the one or more processors are further configured to:
    receive, from one or more sensor devices, at least one of:
       linkage data indicating a linkage position of a linkage of the machine, or
       payload data indicating a load of an implement of the machine, and
    wherein the one or more processors, to determine the stopping distance, are configured to:
       determine the stopping distance based on the machine velocity data and the at least one of the linkage data or the payload data.

20. The controller of claim 15, wherein the one or more processors are further configured to:
    receive, from one or more sensor devices, at least one of:
       articulation data indicating an articulation configuration associated with a front portion of the machine and a rear portion of the machine, or
       linkage data indicating a linkage position of a linkage of the machine, and wherein the one or more processors, to determine the stopping distance, are configured to:
  determine the stopping distance based on the machine velocity data and the at least one of the articulation data or the linkage data.

\* \* \* \* \*